United States Patent [19]
Konigsburg

[11] Patent Number: 5,784,391
[45] Date of Patent: Jul. 21, 1998

[54] DISTRIBUTED MEMORY SYSTEM WITH ECC AND METHOD OF OPERATION

[75] Inventor: Brian R. Konigsburg, Austin, Tex.

[73] Assignee: International Business Machines Corporation, Armonk, N.Y.

[21] Appl. No.: 727,332

[22] Filed: Oct. 8, 1996

[51] Int. Cl.[6] ............................................. G06F 11/10
[52] U.S. Cl. ............................................. 371/40.18
[58] Field of Search ........................... 371/40.18, 40.17; 395/182.04

[56] References Cited

U.S. PATENT DOCUMENTS

| | | | |
|---|---|---|---|
| 5,134,616 | 7/1992 | Barth, Jr. et al. | 371/10.3 |
| 5,214,657 | 5/1993 | Farnworth et al. | 371/40.1 |
| 5,307,356 | 4/1994 | Fifield | 371/40.1 |
| 5,313,425 | 5/1994 | Lee et al. | 365/201 |
| 5,383,205 | 1/1995 | Makihara et al. | 371/40.1 |
| 5,535,226 | 7/1996 | Drake et al. | 371/40.1 |
| 5,537,421 | 7/1996 | Dujari et al. | 371/37.1 |

*Primary Examiner*—Stephen M. Baker
*Attorney, Agent, or Firm*—Joseph C. Redmond, Jr.; John E. Hoel; Anthony V. S. England

[57] ABSTRACT

A superscalar microprocessor chip includes a core processor with a distributed memory surrounding the perimeter of the processor. The distributed memory is arranged in sub-memory elements, each memory sub-element including check bits for each word stored in the sub-element. The number of check bits for each word is based upon the check bits required for a memory word formed from each word in each memory subelement, the number of ECC bits required for the combined word being less than the total number of bits available in the distributed memory. The difference in ECC bits and available bits provides spare bits which are used to route the ECC bits to ECC circuity positioned within the distributed memory for single error correction and double error detection. The position of the ECC circuity and the layout of the sub-memory elements with respect to the ECC circuitry are arranged to minimize the travel of the ECC bits for data correction or detection purposes, and does not adversely affect processor cycle time.

6 Claims, 11 Drawing Sheets

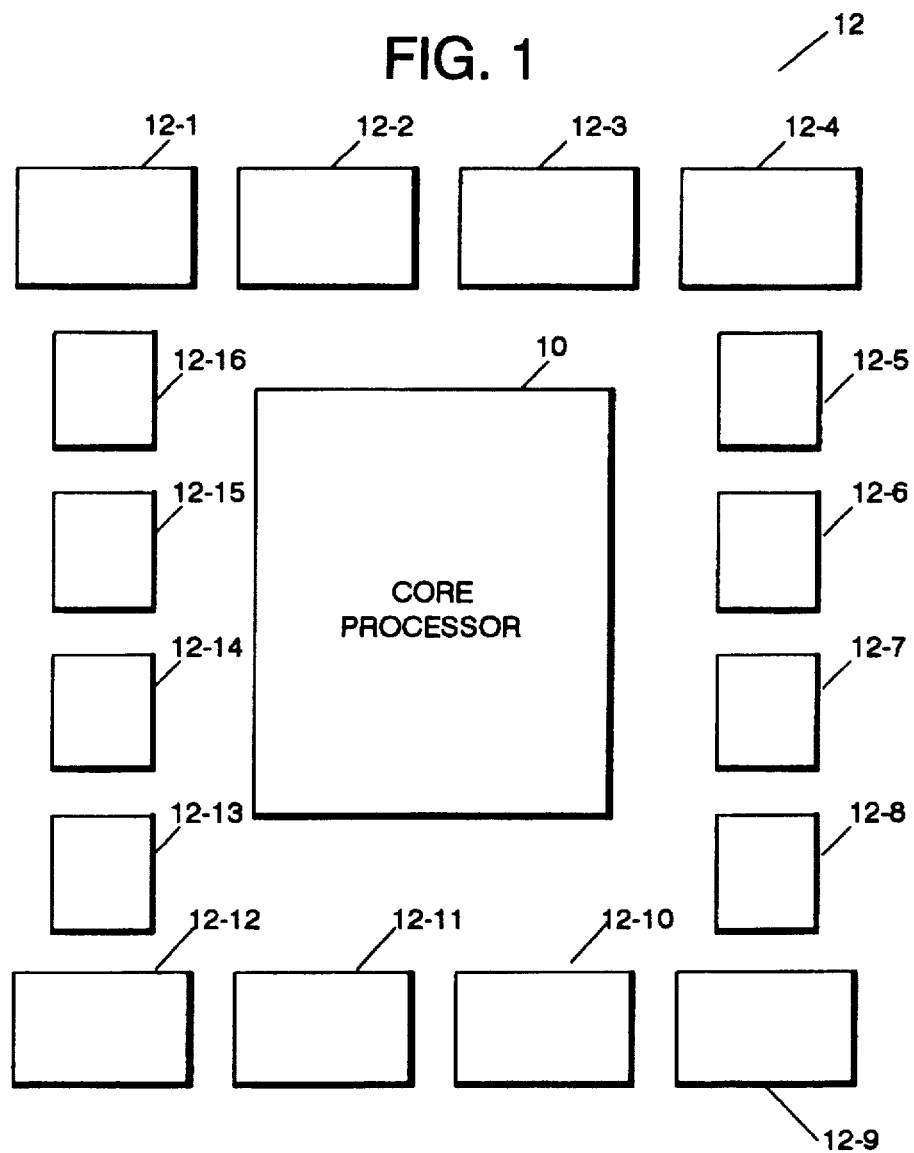

TABLE 1:641 ECC ENCODING

| BK | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | 0 | 0 | 0 | 0 | 0 | 0 | 1 | 1 | | | | | | | 1 |
| 1 | 0 | 0 | 0 | 0 | 0 | 1 | 0 | 1 | | | | | | | 1 |
| 2 | 0 | 0 | 0 | 0 | 0 | 1 | 1 | 0 | | | | | | | 1 |
| 3 | 0 | 0 | 0 | 0 | 0 | 1 | 1 | 1 | | | | | | | 0 |
| 4 | 0 | 0 | 0 | 0 | 1 | 0 | 0 | 1 | | | | | | | 1 |
| 5 | 0 | 0 | 0 | 0 | 1 | 0 | 1 | 0 | | | | | | | 1 |
| 6 | 0 | 0 | 0 | 0 | 1 | 0 | 1 | 1 | | | | | | | 0 |
| 7 | 0 | 0 | 0 | 0 | 1 | 1 | 0 | 0 | | | | | | | 1 |
| 128 | 0 | 0 | 0 | 0 | 1 | 1 | 0 | 1 | | | | | | | 0 |
| 8 | 0 | 0 | 1 | 0 | 0 | 0 | 1 | 1 | | | | | | | 0 |
| 9 | 0 | 0 | 1 | 0 | 0 | 1 | 0 | 1 | | | | | | | 0 |
| 10 | 0 | 0 | 1 | 0 | 0 | 1 | 1 | 0 | | | | | | | 0 |
| 11 | 0 | 0 | 1 | 0 | 0 | 1 | 1 | 1 | | | | | | | 1 |
| 12 | 0 | 0 | 1 | 0 | 1 | 0 | 0 | 1 | | | | | | | 0 |
| 13 | 0 | 0 | 1 | 0 | 1 | 0 | 1 | 0 | | | | | | | 0 |
| 14 | 0 | 0 | 1 | 0 | 1 | 0 | 1 | 1 | | | | | | | 1 |
| 15 | 0 | 0 | 1 | 0 | 1 | 1 | 0 | 0 | | | | | | | 0 |
| B2 | 0 | 0 | 1 | 0 | 1 | 1 | 0 | 1 | | | | | | | 1 |
| 16 | 1 | 0 | | | | | | | 1 | 0 | 0 | 0 | 1 | 1 | 1 |
| 17 | 1 | 0 | | | | | | | 1 | 0 | 0 | 1 | 0 | 1 | 1 |
| 18 | 1 | 0 | | | | | | | 1 | 0 | 0 | 1 | 1 | 0 | 1 |
| 19 | 1 | 0 | | | | | | | 1 | 0 | 0 | 1 | 1 | 1 | 0 |
| 20 | 1 | 0 | | | | | | | 1 | 0 | 1 | 0 | 0 | 1 | 1 |
| 21 | 1 | 0 | | | | | | | 1 | 0 | 1 | 0 | 1 | 0 | 1 |
| 22 | 1 | 0 | | | | | | | 1 | 0 | 1 | 0 | 1 | 1 | 0 |
| 23 | 1 | 0 | | | | | | | 1 | 0 | 1 | 1 | 0 | 0 | 1 |
| B9 | 1 | 0 | | | | | | | 1 | 0 | 1 | 1 | 0 | 1 | 0 |

FIG. 4A

TABLE 1:641 ECC ENCODING

| BK | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 64 | 0 | 0 | 0 | 1 | 0 | 0 | 1 | 1 | | | | | | | 0 |
| 65 | 0 | 0 | 0 | 1 | 0 | 1 | 0 | 1 | | | | | | | 0 |
| 66 | 0 | 0 | 0 | 1 | 0 | 1 | 1 | 0 | | | | | | | 0 |
| 67 | 0 | 0 | 0 | 1 | 0 | 1 | 1 | 1 | | | | | | | 1 |
| 68 | 0 | 0 | 0 | 1 | 1 | 0 | 0 | 1 | | | | | | | 0 |
| 69 | 0 | 0 | 0 | 1 | 1 | 0 | 1 | 0 | | | | | | | 0 |
| 70 | 0 | 0 | 0 | 1 | 1 | 0 | 1 | 1 | | | | | | | 1 |
| 71 | 0 | 0 | 0 | 1 | 1 | 1 | 0 | 0 | | | | | | | 0 |
| B5 | 0 | 0 | 0 | 1 | 1 | 1 | 0 | 1 | | | | | | | 1 |
| 72 | 0 | 0 | 1 | 1 | 0 | 0 | 1 | 1 | | | | | | | 1 |
| 73 | 0 | 0 | 1 | 1 | 0 | 1 | 0 | 1 | | | | | | | 1 |
| 74 | 0 | 0 | 1 | 1 | 0 | 1 | 1 | 0 | | | | | | | 1 |
| 75 | 0 | 0 | 1 | 1 | 0 | 1 | 1 | 1 | | | | | | | 0 |
| 76 | 0 | 0 | 1 | 1 | 1 | 0 | 0 | 1 | | | | | | | 1 |
| 77 | 0 | 0 | 1 | 1 | 1 | 0 | 1 | 0 | | | | | | | 1 |
| 78 | 0 | 0 | 1 | 1 | 1 | 0 | 1 | 1 | | | | | | | 0 |
| 79 | 0 | 0 | 1 | 1 | 1 | 1 | 0 | 0 | | | | | | | 1 |
| B4 | 0 | 0 | 1 | 1 | 1 | 1 | 0 | 1 | | | | | | | 0 |
| 80 | 1 | 0 | | | | | | | 1 | 1 | 0 | 0 | 1 | 1 | 0 |
| 81 | 1 | 0 | | | | | | | 1 | 1 | 0 | 1 | 0 | 1 | 0 |
| 82 | 1 | 0 | | | | | | | 1 | 1 | 0 | 1 | 1 | 0 | 0 |
| 83 | 1 | 0 | | | | | | | 1 | 1 | 0 | 1 | 1 | 1 | 1 |
| 84 | 1 | 0 | | | | | | | 1 | 1 | 1 | 0 | 0 | 1 | 0 |
| 85 | 1 | 0 | | | | | | | 1 | 1 | 1 | 0 | 1 | 0 | 0 |
| 86 | 1 | 0 | | | | | | | 1 | 1 | 1 | 0 | 1 | 1 | 1 |
| 87 | 1 | 0 | | | | | | | 1 | 1 | 1 | 1 | 0 | 0 | 0 |
| B12 | 1 | 0 | | | | | | | 1 | 1 | 1 | 1 | 0 | 1 | 1 |

| FIG. 4C-1 |
| FIG. 4C-2 |

FIG. 4C-1

TABLE 1
CONTINUED

| BK | 0 | 1 | 2 | 3 | 4 | 5 | 6 | 7 | 8 | 9 | 10 | 11 | 12 | 13 | 14 |
|----|---|---|---|---|---|---|---|---|---|---|----|----|----|----|----|
| 24 | 0 | 1 | 0 | 0 | 0 | 0 | 1 | 1 |   |   |    |    |    |    | 0  |
| 25 | 0 | 1 | 0 | 0 | 0 | 1 | 0 | 1 |   |   |    |    |    |    | 0  |
| 26 | 0 | 1 | 0 | 0 | 0 | 1 | 1 | 0 |   |   |    |    |    |    | 0  |
| 27 | 0 | 1 | 0 | 0 | 0 | 1 | 1 | 1 |   |   |    |    |    |    | 1  |
| 28 | 0 | 1 | 0 | 0 | 1 | 0 | 0 | 1 |   |   |    |    |    |    | 0  |
| 29 | 0 | 1 | 0 | 0 | 1 | 0 | 1 | 0 |   |   |    |    |    |    | 0  |
| 30 | 0 | 1 | 0 | 0 | 1 | 0 | 1 | 1 |   |   |    |    |    |    | 1  |
| 31 | 0 | 1 | 0 | 0 | 1 | 1 | 0 | 0 |   |   |    |    |    |    | 0  |
| B1 | 0 | 1 | 0 | 0 | 1 | 1 | 0 | 1 |   |   |    |    |    |    | 1  |
| 32 | 1 | 0 |   |   |   |   |   |   | 0 | 0 | 0  | 0  | 1  | 1  | 0  |
| 33 | 1 | 0 |   |   |   |   |   |   | 0 | 0 | 0  | 1  | 0  | 1  | 0  |
| 34 | 1 | 0 |   |   |   |   |   |   | 0 | 0 | 0  | 1  | 1  | 0  | 0  |
| 35 | 1 | 0 |   |   |   |   |   |   | 0 | 0 | 0  | 1  | 1  | 1  | 1  |
| 36 | 1 | 0 |   |   |   |   |   |   | 0 | 0 | 1  | 0  | 0  | 1  | 0  |
| 37 | 1 | 0 |   |   |   |   |   |   | 0 | 0 | 1  | 0  | 1  | 0  | 0  |
| 38 | 1 | 0 |   |   |   |   |   |   | 0 | 0 | 1  | 0  | 1  | 1  | 1  |
| 39 | 1 | 0 |   |   |   |   |   |   | 0 | 0 | 1  | 1  | 0  | 0  | 0  |
| B0 | 1 | 0 |   |   |   |   |   |   | 0 | 0 | 1  | 1  | 0  | 1  | 1  |
| 40 | 0 | 1 | 1 | 0 | 0 | 0 | 1 | 1 |   |   |    |    |    |    | 1  |
| 41 | 0 | 1 | 1 | 0 | 0 | 1 | 0 | 1 |   |   |    |    |    |    | 1  |
| 42 | 0 | 1 | 1 | 0 | 0 | 1 | 1 | 0 |   |   |    |    |    |    | 1  |
| 43 | 0 | 1 | 1 | 0 | 0 | 1 | 1 | 1 |   |   |    |    |    |    | 0  |

| | | | | | | | | | | | | | | |
|---|---|---|---|---|---|---|---|---|---|---|---|---|---|---|
| 44 | 0 | 1 | 1 | 0 | 1 | 0 | 0 | 1 | | | | | | 1 |
| 45 | 0 | 1 | 1 | 0 | 1 | 0 | 1 | 0 | | | | | | 1 |
| 46 | 0 | 1 | 1 | 0 | 1 | 0 | 1 | 1 | | | | | | 0 |
| 47 | 0 | 1 | 1 | 0 | 1 | 1 | 0 | 0 | | | | | | 1 |
| BS | 0 | 1 | 1 | 0 | 1 | 1 | 0 | 1 | | | | | | 0 |
| 48 | 1 | 1 | | | | | | | 1 | 0 | 0 | 0 | 1 | 1 | 1 |
| 49 | 1 | 1 | | | | | | | 1 | 0 | 0 | 1 | 0 | 1 | 1 |
| 50 | 1 | 1 | | | | | | | 1 | 0 | 0 | 1 | 1 | 0 | 1 |
| 51 | 1 | 1 | | | | | | | 1 | 0 | 0 | 1 | 1 | 1 | 0 |
| 52 | 1 | 1 | | | | | | | 1 | 0 | 1 | 0 | 0 | 1 | 1 |
| 53 | 1 | 1 | | | | | | | 1 | 0 | 1 | 0 | 1 | 0 | 1 |
| 54 | 1 | 1 | | | | | | | 1 | 0 | 1 | 0 | 1 | 1 | 0 |
| 55 | 1 | 1 | | | | | | | 1 | 0 | 1 | 1 | 0 | 0 | 1 |
|  | 1 | 1 | | | | | | | 1 | 0 | 1 | 1 | 0 | 1 | 0 |
| 56 | 1 | 1 | | | | | | | 0 | 0 | 0 | 0 | 1 | 1 | 1 |
| 57 | 1 | 1 | | | | | | | 0 | 0 | 0 | 1 | 0 | 1 | 1 |
| 58 | 1 | 1 | | | | | | | 0 | 0 | 0 | 1 | 1 | 0 | 1 |
| 59 | 1 | 1 | | | | | | | 0 | 0 | 0 | 1 | 1 | 1 | 0 |
| 60 | 1 | 1 | | | | | | | 0 | 0 | 1 | 0 | 0 | 1 | 1 |
| 61 | 1 | 1 | | | | | | | 0 | 0 | 1 | 0 | 1 | 0 | 1 |
| 62 | 1 | 1 | | | | | | | 0 | 0 | 1 | 0 | 1 | 1 | 0 |
| 63 | 1 | 1 | | | | | | | 0 | 0 | 1 | 1 | 0 | 0 | 1 |
| BP | 1 | 1 | | | | | | | 0 | 0 | 1 | 1 | 0 | 1 | 0 |

TABLE 1
CONTINUED

| FIG. 4D-1 |
|---|
| FIG. 4D-2 |

TABLE 1
CONTINUED

| BK | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 88 | 0 | 1 | 0 | 1 | 0 | 0 | 1 | 1 | | | | | | | 1 |
| 89 | 0 | 1 | 0 | 1 | 0 | 1 | 0 | 1 | | | | | | | 1 |
| 90 | 0 | 1 | 0 | 1 | 0 | 1 | 1 | 0 | | | | | | | 1 |
| 91 | 0 | 1 | 0 | 1 | 0 | 1 | 1 | 1 | | | | | | | 0 |
| 92 | 0 | 1 | 0 | 1 | 1 | 0 | 0 | 1 | | | | | | | 1 |
| 93 | 0 | 1 | 0 | 1 | 1 | 0 | 1 | 0 | | | | | | | 1 |
| 94 | 0 | 1 | 0 | 1 | 1 | 0 | 1 | 1 | | | | | | | 0 |
| 95 | 0 | 1 | 0 | 1 | 1 | 1 | 0 | 0 | | | | | | | 1 |
| B7 | 0 | 1 | 0 | 1 | 1 | 1 | 0 | 1 | | | | | | | 0 |
| 96 | 1 | 0 | | | | | | | 0 | 1 | 0 | 0 | 1 | 1 | 1 |
| 97 | 1 | 0 | | | | | | | 0 | 1 | 0 | 1 | 0 | 1 | 1 |
| 98 | 1 | 0 | | | | | | | 0 | 1 | 0 | 1 | 1 | 0 | 1 |
| 99 | 1 | 0 | | | | | | | 0 | 1 | 0 | 1 | 1 | 1 | 0 |
| 100 | 1 | 0 | | | | | | | 0 | 1 | 1 | 0 | 0 | 1 | 1 |
| 101 | 1 | 0 | | | | | | | 0 | 1 | 1 | 0 | 1 | 0 | 1 |
| 102 | 1 | 0 | | | | | | | 0 | 1 | 1 | 0 | 1 | 1 | 0 |
| 103 | 1 | 0 | | | | | | | 0 | 1 | 1 | 1 | 0 | 0 | 1 |
| B13 | 1 | 0 | | | | | | | 0 | 1 | 1 | 1 | 0 | 1 | 0 |
| 104 | 0 | 1 | 1 | 1 | 0 | 0 | 1 | 1 | | | | | | | 0 |
| 105 | 0 | 1 | 1 | 1 | 0 | 1 | 0 | 1 | | | | | | | 0 |
| 106 | 0 | 1 | 1 | 1 | 0 | 1 | 1 | 0 | | | | | | | 0 |
| 107 | 0 | 1 | 1 | 1 | 0 | 1 | 1 | 1 | | | | | | | 1 |

| | | | | | | | | | | | | | | |
|---|---|---|---|---|---|---|---|---|---|---|---|---|---|---|
| 108 | 0 | 1 | 1 | 1 | 1 | 0 | 0 | 1 | | | | | | 0 |
| 109 | 0 | 1 | 1 | 1 | 1 | 0 | 1 | 0 | | | | | | 0 |
| 110 | 0 | 1 | 1 | 1 | 1 | 0 | 1 | 1 | | | | | | 1 |
| 111 | 0 | 1 | 1 | 1 | 1 | 1 | 0 | 0 | | | | | | 0 |
| B6 | 0 | 1 | 1 | 1 | 1 | 1 | 0 | 1 | | | | | | 1 |
| 112 | 1 | 1 | | | | | | | 1 | 1 | 0 | 0 | 1 | 1 | 1 |
| 113 | 1 | 1 | | | | | | | 1 | 1 | 0 | 1 | 0 | 1 | 1 |
| 114 | 1 | 1 | | | | | | | 1 | 1 | 0 | 1 | 1 | 0 | 1 |
| 115 | 1 | 1 | | | | | | | 1 | 1 | 0 | 1 | 1 | 1 | 0 |
| 116 | 1 | 1 | | | | | | | 1 | 1 | 1 | 0 | 0 | 1 | 1 |
| 117 | 1 | 1 | | | | | | | 1 | 1 | 1 | 0 | 1 | 0 | 1 |
| 118 | 1 | 1 | | | | | | | 1 | 1 | 1 | 0 | 1 | 1 | 0 |
| 119 | 1 | 1 | | | | | | | 1 | 1 | 1 | 1 | 0 | 0 | 1 |
| B10 | 1 | 1 | | | | | | | 1 | 1 | 1 | 1 | 0 | 1 | 0 |
| 120 | 1 | 1 | | | | | | | 0 | 1 | 0 | 0 | 1 | 1 | 0 |
| 121 | 1 | 1 | | | | | | | 0 | 1 | 0 | 1 | 0 | 1 | 0 |
| 122 | 1 | 1 | | | | | | | 0 | 1 | 0 | 1 | 1 | 0 | 0 |
| 123 | 1 | 1 | | | | | | | 0 | 1 | 0 | 1 | 1 | 1 | 1 |
| 124 | 1 | 1 | | | | | | | 0 | 1 | 1 | 0 | 0 | 1 | 0 |
| 125 | 1 | 1 | | | | | | | 0 | 1 | 1 | 0 | 1 | 0 | 0 |
| 126 | 1 | 1 | | | | | | | 0 | 1 | 1 | 0 | 1 | 1 | 1 |
| 127 | 1 | 1 | | | | | | | 0 | 1 | 1 | 1 | 0 | 0 | 0 |
| B11 | 1 | 1 | | | | | | | 0 | 1 | 1 | 1 | 0 | 1 | 1 |

TABLE 1
CONTINUED

TABLE II

| SYNDROME | FUNCTION OF | | | | | | |
|---|---|---|---|---|---|---|---|
| 0 | A[8].[0] | A[9].[0] | A[A].[0] | A[B].[0] | A[C].[0] | A[D].[0] | A[E].[0] | A[F].[0] |
| 1 | A[4].[0] | A[5].[0] | A[6].[0] | A[7].[0] | A[C].[0] | A[D].[0] | A[E].[0] | A[F].[0] |
| 2 | A[2].[0] | A[3].[0] | A[6].[0] | A[7].[0] | | | | |
| 3 | A[1].[0] | A[3].[0] | A[5].[0] | A[7].[0] | | | | |
| 4 | A[0].[4] | A[1].[4] | A[2].[4] | A[3].[4] | A[4].[4] | A[5].[4] | A[6].[4] | A[7].[4] |
| 5 | A[0].[5] | A[1].[5] | A[2].[5] | A[3].[5] | A[4].[5] | A[5].[5] | A[6].[5] | A[7].[5] |
| 6 | A[0].[6] | A[1].[6] | A[2].[6] | A[3].[6] | A[4].[6] | A[5].[6] | A[6].[6] | A[7].[6] |
| 7 | A[0].[7] | A[1].[7] | A[2].[7] | A[3].[7] | A[4].[7] | A[5].[7] | A[6].[7] | A[7].[7] |
| 8 | A[A].[0] | A[B].[0] | A[E].[0] | A[F].[0] | | | | |
| 9 | A[9].[0] | A[B].[0] | A[D].[0] | A[F].[0] | | | | |
| A | A[8].[4] | A[9].[4] | A[A].[4] | A[B].[4] | A[C].[4] | A[D].[4] | A[E].[4] | A[F].[4] |
| B | A[8].[5] | A[9].[5] | A[A].[5] | A[B].[5] | A[C].[5] | A[D].[5] | A[E].[5] | A[F].[5] |
| C | A[8].[6] | A[9].[6] | A[A].[6] | A[B].[6] | A[C].[6] | A[D].[6] | A[E].[6] | A[F].[6] |
| D | A[8].[7] | A[9].[7] | A[A].[7] | A[B].[7] | A[C].[7] | A[D].[7] | A[E].[7] | A[F].[7] |
| E | NOT ROUTING/TIMING ISSUE | | | | | | | |

DISTRIBUTED MEMORY SYSTEM WITH ECC AND METHOD OF OPERATION

BACKGROUND OF THE INVENTION

1. Field of the Invention

This invention relates to memory systems. More particularly, the invention relates to distributed memory systems with ECC and methods of operation.

2. Description of Prior Art

Distributed memory systems are well known in supercomputing systems. Such systems, in one form, have multiprocessors and related memory interconnected through a message passing network where the multiprocessor and memory are physically arranged to be adjacent to one another to shorten the message passing path. See the text "Advanced Computer Architecture" by K. Wang, published by McGraw-Hill Inc., 1993, Chapter 1. In superscalar microprocessor computing systems, such as the PowerPC (™) microprocessor family, a distributed memory can now be embedded in the microprocessor chip and surround a core multiprocessor to form a shortened message path in lieu of passing the message entirely through an on or off chip memory.

Error Correction Codes (ECC) are used to correct certain classes of errors in memory storage elements to greatly reduce the probability of an error affecting the memory output. The prior art uses combinations of all of the bits in the memory elements to generate and store the redundancy used to correct errors. When a memory element is distributed across a large physical area, the routing and time required to bring the stored data to a central location and then distribute the error information for data correction can adversely affect cycle time or pipeline depth of the processor. One solution to overcome the routing and time required for data transfer would be to provide multiple ECC codes for memory element subsets. The additional redundancy bits for each memory subset could substantially increase the size of the individual memory elements. For example, if the number of memory element subsets is $2^{n-1}$ where "n" is the number of redundancy bits and there are R redundancy codes for a single code, than the new number of redundancy bits is (n*R)-n bits which substantially increases the number of bits for each individual memory element. For example, assuming an 18-bit wide memory subelement with 2 codes per subelement, adding one extra code bit would increase the cache memory by 11 percent. Such additional bits would further contribute to the routing and time required to bring the stored data to a central location and then distribute the error information for data correction.

The prior art has addressed ECC in memory systems, as follows:

U.S. Pat. No. 5,134,616 issued Jul. 28, 1992, discloses a dynamic RAM with access memory incorporating on-chip ECC in which error correcting circuitry is coupled to a an array comprising a plurality of word lines, a plurality of bit lines, a plurality of redundant bit lines and a separate array of redundant word lines. Address means access an error correction word in the array. The error correcting circuitry reads out the error correction word and corrects any faulty data bits therein and provides data bits as corrected for external read out.

U.S. Pat. No. 5,214,657 issued May 25, 1993, discloses a plurality of discrete memory sections separated from one another in a wafer by a street area. Error detection and correction circuitry is provided within the street area to detect and correct errors generated within the discrete memory section. Conductive interconnecting lines extend from the discrete memory section to the error detection and correction circuitry within the street area.

U.S. Pat. No. 5,313,425 issued May 17, 1994, discloses a plurality of electrically isolated data memory subarrays for storing data bits and a plurality of electrically isolated parity memory subarrays for storing parity bits. Each memory has memory cells in each row connected to a common word line and memory cells in each column connected to a common bit line. Row and column address decoders function to couple a selected bit line in each subarray to sense amplifiers which function to sense the voltage level of respective ones of the selected bit lines and produce output data and parity bits representative of sensed voltage level. An error checking and correction circuit compares the output data and parity bits to detect and correct errors in the output data bits. Defects in word or bit lines are confined to a single bit thereby rendering these defects easily reparable by the ECC circuit and dispensing with the need of redundant memory circuit.

U.S. Pat. No. 5,307,356 issued Apr. 26, 1994, discloses an interlock on-chip ECC system that minimizes access delays imposed by the ECC system. Data flows between a dynamic RAM, the ECC, and a register that stores corrected data. The register is synchronized by a combination of interlocks and clocking signals to minimize both access and cycle time delays without compromising ECC performance.

U.S. Pat. No. 5,383,205 issued Jan. 17, 1995, and filed Jun. 5, 1992, discloses a memory cell array having a plurality of data and a plurality of parity data stored therein. Error correction means for correcting an error in the plurality of data applies a predetermined Hamming matrix to the plurality of data and parity data read out of the array. The data is divided into a first and second group, a syndrome generator produces syndrome signals on the basis of the first and second groups of data and plurality of parity data read from the memory. The data from the first and second groups are sequentially selected. A correction signal for the first group and a correction signal for the second group is selected in synchronism with a response to the syndrome signals. Data correction means correct an error in the group of data selected according to a correction signal produced by the correction signal generator.

U.S. Pat. No. 5,535,226 issued Jul. 9, 1996, and filed May 31, 1994, discloses a computer system having on-chip memory determining which memory device in an array of memory devices is producing errors beyond the capability of the on-chip ECC to handle whereby the error correction is deactivated in response to an uncorrectable error. The ECC includes means for uncorrectable error recovery.

U.S. Pat. No. 5,537,421 issued Jul. 16, 1996, and filed Oct. 7, 1988, discloses an error processor in an integrated chip which detects and corrects errors in a block of received data. The processor includes hardware for receiving data and generating syndrome bytes corresponding to the received data. The hardware detects errors in the received data and generates correction vectors to indicate the relative locations and error values. An interface is connected to the processing hardware for facilitating data transfer to and from a communications bus.

None of the prior art discloses or suggests a distributed memory system in a microprocessor chip and method of operation in which a minimum number of check bits for each memory sub-element are efficiently routed to error correcting circuitry within the distributed memory without adversely affecting memory cycle time or processor pipeline depth.

SUMMARY OF THE INVENTION

An object of the invention is a distributed memory system in a microprocessor chip and method of operation having a minimum travel length for check bits to ECC circuitry.

Another object is a super scalar microprocessor with an on chip distributed memory system having ECC without affecting memory cycle time.

Another object is a distributed memory system and method of operation with ECC circuitry distributed within the memory element to minimize check bit travel between a memory element and the ECC circuitry.

Another object is a distributed memory system for a core microprocessor and method of operation in which ECC circuitry is positioned in the memory to limit check bit travel to a portion of the perimeter of the core processor.

Another object is a distributed memory system and method of operation using otherwise spare memory bits to partition ECC circuitry between parts of the distributed memory for single error correction and double error detection.

These and other objects, features and advantages are achieved in a data processing system having a superscalar core processor and a distributed memory embedded in the chip, the distributed memory surrounding the perimeter of the processor. The distributed memory is arranged in sub-memory elements. Each memory sub-element may include one or more ECC check bits for the entire memory word. The number of check bits for each word is based upon the check bits required for a memory word formed from each word in each memory subelement. The number of ECC bits required for the memory word is calculated then bits are uniformly added until the number of ECC bits are less than or equal to the number of unused bits available in the memory word. The difference in ECC bits and available bits provides spare bits which are used to route the ECC bits to ECC circuitry positioned within the distributed memory for single error correction and/or double error detection. The position of the ECC circuity, the syndrome coding and the layout of the sub-memory elements are arranged to minimize the travel of the ECC bits to the ECC circuitry for data correction or detection purposes whereby processor cycle time is not impaired due to error correction.

DESCRIPTION OF DRAWING

FIG. 1 is a block diagram of an on chip distributed memory and core processor which incorporates the principles of the present invention.

FIG. 2 is a representation of a memory word exchanged between the distributed memory and core processor of FIG. 1.

FIGS. 4A–4D2 are a Table 1 of a sample ECC bit encoder for the memory word of FIG. 2.

FIG. 6 is a Table 2 of syndrome bits using the partial syndrome bits of FIG. 4 for each check bit in the memory word of FIG. 2.

DESCRIPTION OF PREFERRED EMBODIMENT

Figure 3:
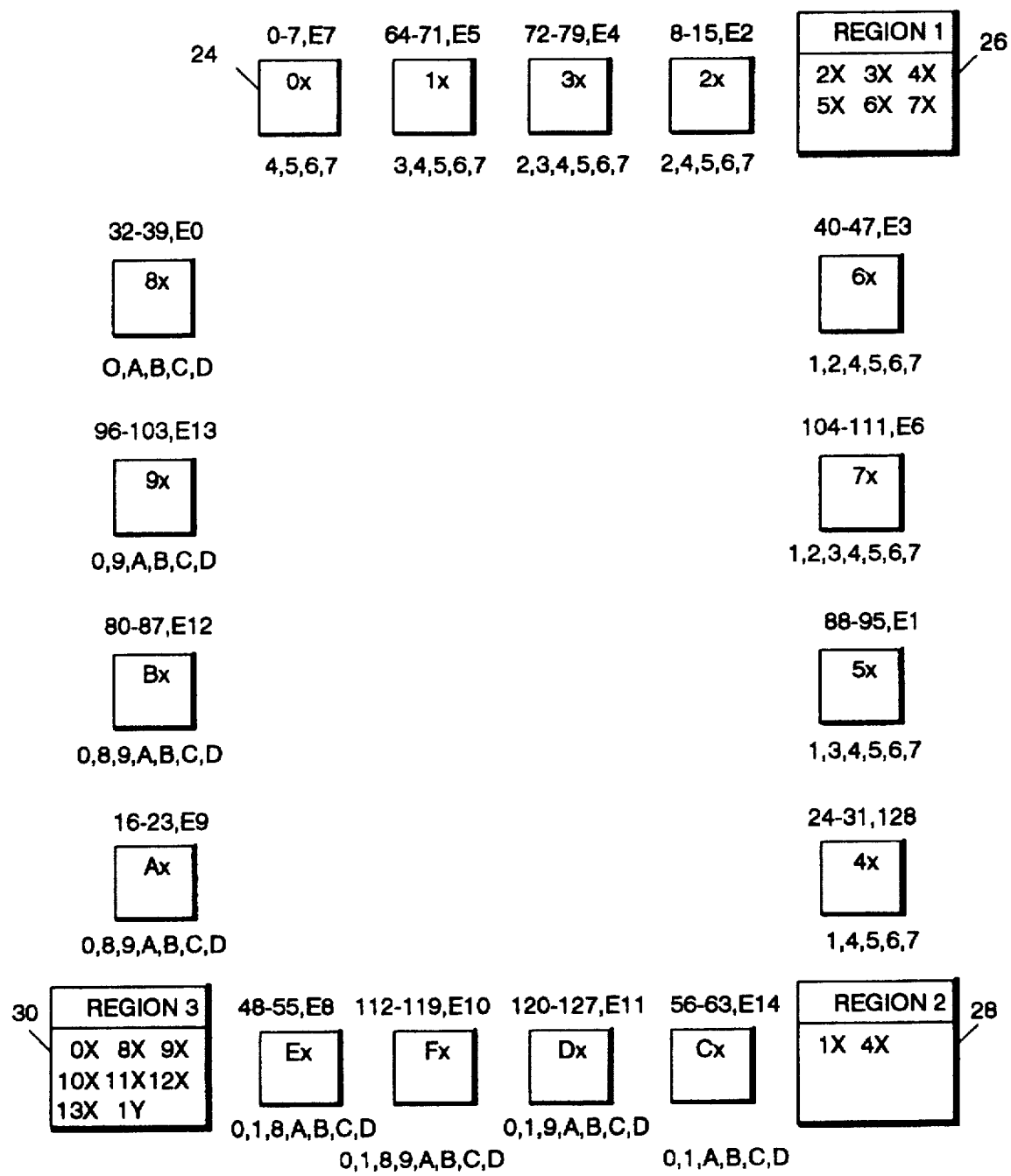
FIG. 3 is a layout of memory sub-elements and ECC circuitry for the distributed memory of FIG. 1.

In FIG. 1 a core processor 10, such as a PowerPC 601 superscalar microprocessor is surrounded by a distributed memory 12 comprising subelements 12-1 ... 12-n, where "n" is any non-zero integer and the bit-width of each subelement is substantially the same, such that the total number of bits stored in all memory elements provides the memory capacity required by the core processor 10 plus check bits. The PowerPC 601 superscalar microprocessor is manufactured and sold by IBM Microelectronics, Essex Junction, VT as part number 52G7484. For purposes of the present description, the number of memory elements is selected to be 16, with each memory element being 9-bits wide. Data is exchanged between the distributed memory and the core processor as 15- 8 bit words or 128 bits and one 9 bit word or a total word size of 129 bits.

For error correcting purposes, it can be shown that a 129 bit word requires 9 ECC bits for single error correction and double bit error detection based upon the text, "An Introduction to Error Correcting Codes" by Shu Lin, published by Prentice-Hall, Englewood Cliffs, N.J., 1970, page 95. To implement a 129 bit data word in 16 memory sub-elements requires 9 bits in each sub-element. One bit in 15 of the memory sub-elements will be a spare bit or a total of 15 spare bits (0–14). Eight of the 15 ECC bits are reserved for single error correction. One bit is reserved for double error detection, leaving 6 spare bits which can be used to assist in routing the ECC bits from each memory sub-element or subarray to error correcting circuits. Obviously, the number of spare bits for routing purposes can be increased or decreased according to the memory word size or the degree to which limited travel of the ECC bit is desired.

The memory cycle time for processing ECC bits can be improved by limiting the travel of ECC bits to a portion of the perimeter of the core processor, typically less than half perimeter and preferably in the range of ¼ the perimeter length, according to the number of available spare bits for routing purposes. To accomplish this objective, error correcting circuits are positioned in the array as will be described in connection with FIGS. 2 and 3.

In FIG. 2, a data word 14 exchanged between the core processor and distributed memory of FIG. 1 includes 129 data bits in field 16; 8 ECC bits for single error correction in field 18; 1 bit for double error detection in field 20; and 6 spare bits for ECC routing purposes in field 22. Using the 6 spare bits per code, 6 of the 9 ECC bits can be partitioned to a half of the subarrays. In addition, two of the remaining three ECC bits can be localized to one-half of the subarrays. That leaves only one check bit to be a function of all subarrays which can be used to distinguish between single and double bit errors.

In FIG. 3, a physical layout of a distributed memory is shown which incorporates the principles of the present invention. The memory subelements or subarrays 12-1 ... 12-16 in FIG. 1 are represented by squares 24. Within each square, a subarray is identified by one of the hexadecimal bits 0–9 or A–F with a subscript "x". The data bit numbers and error correction bit number related to each subarray are shown above the respective squares 24. Thus, subarray Ox provides data bits 0–7 and error correcting bit E7 of the 129 bit data word for error correction purposes. Likewise, sub-array Cx provides data bits 56–63 for error correction purposes and error bit 14 for double error detection purposes. The numbers below each subarray are the syndrome bits contributed by the subarray to error correcting circuitry for error correcting purposes, as will be described hereinafter.

Error correcting units 26, 28, and 30 are assigned, each to a different region in the distributed memory about the perimeter of the core processor (not shown). For purposes of explanation, the distributed memory is shown in a square configuration, but the layout of the subarrays could be in other geometrical configurations, according to the shape of the core processor. Each unit 26, 28, 30 includes a plurality of error correcting circuits identified by an integer with a subscript "x" to relate the circuit to a particular bit of the final syndrome word. Nonzero syndrome patterns are assigned to each data bit and check bit of the memory word and each bit is assigned to a subarray. One such bit assignment for the subarrays is shown in FIG. 3, which assignment is derived from Table 1 in FIGS. 4A/B. By examining the rows in Table 1, a non-zero value for a table element (row, column) indicates an ECC bit used in calculating a syndrome bit for the data bit assigned to the row. Thus, data bit 8 contributes to syndrome bits 2, 6 and 7 only. Similarly, ECC bit E9 contributes to syndrome bits 0, 8, 10, 12 and 13. This relationship is used to determine which data bits are used in which syndrome generating circuits. By arranging the syndrome pattern of Table 1, the data bit assignment of FIG. 3 and the ECC checking circuits in the regions of FIG. 3, an optimal placement of subarray and ECC checking circuits can be obtained to reduce routing. For example in FIG. 3, below the squares 24 are numbers, such as 4, 5, etc. for subarray Ox; 0, 1, etc. for subarray Cx representing the data bits fed to the indicated syndrome circuits for the indicated syndrome bits provided by the subarrays ox and Cx, respectively. One can connect the numbers below the subarrays individually to each placed ECC circuit to determine the locality of the ECC circuit to the data and ECC bits used in generating the syndrome. Overall, the layout of the ECC circuits and the subarrays is selected such that a syndrome bit from a subarray travels less than half of the length of the core perimeter and preferable no more than ¼ of the perimeter length. It is apparent that by grouping and locating the ECC circuits as described above, the number of routing paths from the subarrays to the ECC circuits can be significantly reduced. Normally, 128 routing channels would be required for error correction purposes. However, the number of routing channels can be shown to be reduced by approximately 40 through locating the ECC circuits and their assigned subarrays to be as close together as possible with the added benefit of reducing worse-case travel distance to ½ the core perimeter. In so doing, error correction time is reduced for memory words and processor cycle time is not impaired by error correction.

As indicated before FIGS. 4A/B, Table 1 shows one possible encoding of ECC bits 0–14 by row for the corresponding data bits 0–129 including ECC bits 0–14, in column 1. To determine the data and ECC bits required to generate a particular syndrome bit, all rows are marked in which a "1" is located (blank entries are "0"). For each such marked entry, the data/error bit in the first or left most column is required for generation of the selected syndrome bit.

Figure 5:
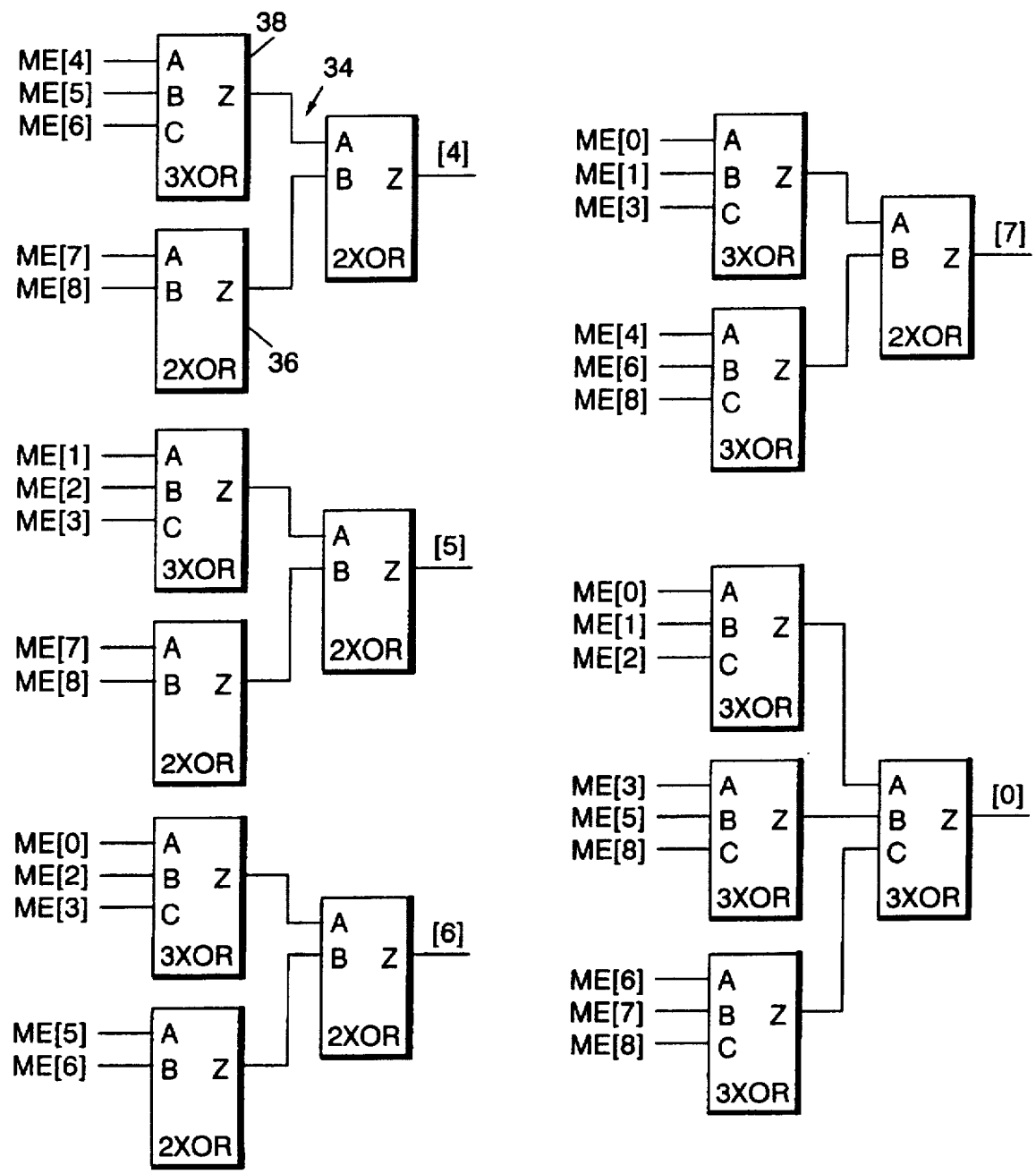
FIG. 5 is a circuit diagram for generating partial syndrome bits in each memory sub-element of FIG. 3.

In FIG. 5, one logic implementation is shown for generating partial syndrome such that all subarrays contain a common logic block utilizing the nine data/ECC bits stored in the memory subarray. Data bits ME(0) ... ME(8) of each 8 bit subarray are shown as inputs to combinatorial logic trees 34 containing 16 Exclusive Or circuit for error correction purposes. The logic outputs 4, 5, 6, 7 and 0 from the trees are labeled based on the syndrome bits to which they contribute. These outputs correspond to the ECC code in Table 1 and provide the basis for error determination in a syndrome function, to be described hereinafter, in calculating which bit within a subarray contains an error. The 0 bit contributes to ECC bits 0, 1, 2 and 3. In addition, memory sub-element bit 8 is also sourced from each subarray for use in syndrome bit 14.

In FIG. 6, Table 2 indicates the syndrome bits for the ECC code in combining error bits 0, 4, 5, 6, and 7 from each subarray to identify data bits or ECC bits which are in error. In one form, the logic for generating each syndrome bit is a multiple OR-Invert function which may be implemented in conventional circuitry. Alternatively, each syndrome bit may be generated using other logic functions such as Exclusive Or Inverts. An error condition is indicated for a syndrome bit when the combined logic units for the bit provide a non-zero output signal level. Each syndrome bit is expressed as A(#), (*) where the "#" sign is a number indicating the hexadecimal subarray number in the distributed memory and the "*" sign is the subarray output as shown in FIG. 5. Thus, the syndrome bit for data bit 0 is generated from subarrays 8; 9; A; B; C; D; E; and F; and the subarray output bits 0; 0; 0; 0; 0; 0; 0; and 0; for the respective subarrays. The syndrome bits 1–9 and A ... E are generated in like manner from the indicated subarray and subarray output bits 4, 5, 6, 7 and 0. Syndrome bit E indicates a non-recoverable error and does not present a timing or routing problem.

Figure 7:
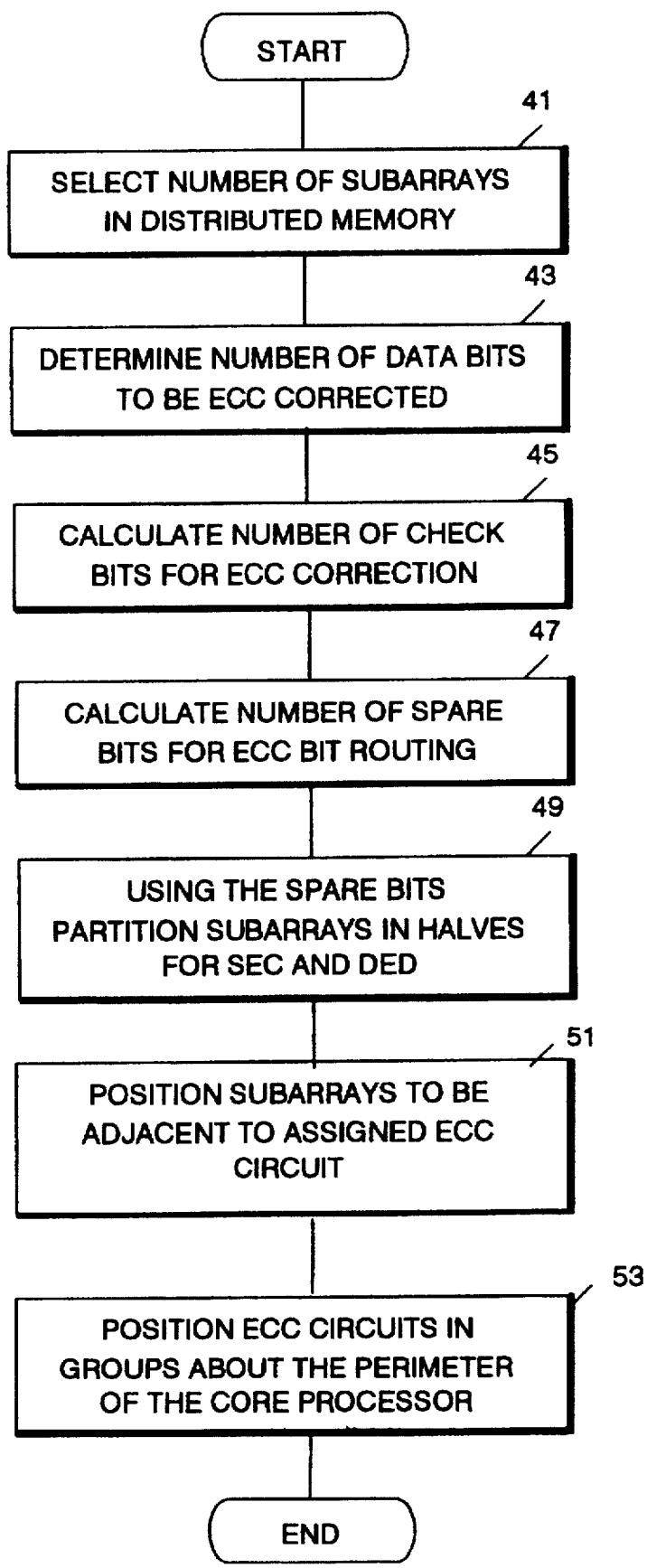
FIG. 7 is a flow diagram for selecting the arrangement of the memory sub-elements and the location of the ECC circuits about the perimeter of the core processor of FIG. 1.

In FIG. 7, a process is shown for positioning the error checking circuits and subarrays relative to one another on the perimeter surrounding a core processor, such that the error checking bits have limited travel on the core perimeter whereby the cycle time of the core processor is not impacted in processing error corrected data. The process is started in a step 41 in which the number of subarrays is selected for a distributed memory which surrounds a core processor. The number of subarrays is dependent upon the size of the binary word processed by the core processor and the physical layout of the memory on the chip. For a processor word containing 129 bits, the number of subarrays could be 16, each subarray 9-bits wide.

In a step 43, the number of data bits is selected for ECC correction. Typically, all data bits are single bit error corrected and usually double bit error detected. If sufficient memory bits are available to partition the memory word into two distinct ECC regions, the problem degrades to two independent processes.

In a step 45, the number of parity or check bits is calculated for ECC coverage purposes of data bits using well-known ECC formula.

In a step 47, the number of spare bits is calculated for ECC bit routing purposes using the number of subarrays less the number of check bits for ECC coverage.

In a step 49, the number of spare bits is used to partition the ECC circuits in units, each unit typically spaced in regions about the perimeter of the core processor for syndrome generation purposes.

In a step 51, the subarrays are assigned a hexadecimal number which is non-sequential and selectively positioned about the periphery of the core processor.

In a step 53, an ECC checker in each unit is assigned to a different nearby regions to limit the ECC bit travel from the subarray to the ECC checker to less than half and preferably no more than one-quarter of the core processor perimeter for syndrome bit generation in the ECC checker for error correction purposes. Steps 51 and 53 may be iterative until an optimal configuration is found. Once the routing and timing constraints are met, the process ends.

While the invention has been described in a preferred embodiment, various modifications may be made therein without departing from the spirit and scope of the invention as defined in the appended claims, in which:

I claim:

1. A distributed memory with ECC for a microprocessor chip comprising:
   a) a plurality of memory subarrays embedded in the chip and forming the distributed memory on a perimeter surrounding a core processor;
   b) ECC logic included in each subarray for generating ECC bits for each word contained in the subarray;
   c) a plurality of ECC checkers arranged in ECC groups for single error correction and/or double error detection, the groups being disposed on the perimeter of the core processor and within the distributed memory; and
   d) means for connecting the subarrays to the nearest ECC subgroup for single error correction or double error detection whereby each ECC bit does not travel more than a limited portion of the core processor perimeter.

2. The distributed memory of claim 1 further comprising means for generating ECC bits for a data bits which provides spare bits for directing ECC bits to the nearest ECC group.

3. The distributed memory of claim 2 further comprising means for positioning each subarray to be in the range of less than half to ¼ or less of the core processor perimeter away from an assigned ECC checker in an ECC group.

4. The distributed memory of claim 3 wherein the ECC logic in each subarray comprising groups of Exclusive Or circuits arranged to generate ECC bits for each word contained in the subarray.

5. The distributed memory of claim 5 wherein the ECC checkers generate syndrome bits for the distributed memory word.

6. In a distributed memory of subarrays with ECC and a core microprocessor chip, each subarray including means for generating ECC bits and an ECC checker for each subarray positioned within the distributed memory, a method of positioning the ECC checkers and the subarrays to limit travel of the ECC bits to the ECC checkers comprising the steps of:

a) selecting the number of subarrays for a distributed memory, according to the size of the binary word processed by the core processor and the byte size of the bits contained within the processor word;
   b) selecting the number of data bits in a memory word for ECC coverage;
   c) calculating the number of parity or check bits for ECC coverage of the data bits and the check bits in the memory word using well-known ECC formula;
   d) calculating the number of spare bits across all subarrays using the total number of available bits in the memory word minus the number of data bits in the memory word minus the minimum number of check bits required for error detection and/or correction;
   e) using the number of spare bits, partitioning the ECC circuits in groups about the perimeter of the core processor for single error correction and/or double error detection;
   f) assigning by group an ECC checker to a group of subarrays; and
   h) assigning the subarrays to an ECC checker to limit the ECC bit travel to no more than a limited portion of the core processor perimeter.

* * * * *